United States Patent [19]

Wrobel

[11] Patent Number: 4,771,119
[45] Date of Patent: Sep. 13, 1988

[54] SOFT SILICONE ELASTOMERS

[75] Inventor: Dieter Wrobel, Cologne, Fed. Rep. of Germany

[73] Assignee: Bayer Aktiengesellschaft, Leverkusen, Fed. Rep. of Germany

[21] Appl. No.: 72,768

[22] Filed: Jul. 13, 1987

[30] Foreign Application Priority Data

Jul. 22, 1986 [DE] Fed. Rep. of Germany ....... 3624776

[51] Int. Cl.$^4$ ............................................. C08G 77/06
[52] U.S. Cl. ...................................... 528/15; 528/31; 528/32; 525/478; 556/479; 524/861; 524/862
[58] Field of Search .................... 556/479; 528/15, 31, 528/32; 525/478; 524/861, 862

[56] References Cited

U.S. PATENT DOCUMENTS

| | | | |
|---|---|---|---|
| 3,020,260 | 2/1982 | Nelson | 260/46.5 |
| 4,558,112 | 12/1985 | Talcott | 528/15 |
| 4,599,367 | 7/1986 | Bauman et al. | 528/15 |
| 4,698,386 | 10/1987 | Fujimoto | 528/15 |

OTHER PUBLICATIONS

Patent Abstracts of Japan, Book 6, No. 19, Feb. 3, 1982.

Primary Examiner—Melvyn I. Marquis
Attorney, Agent, or Firm—Connolly and Hutz

[57] ABSTRACT

A curable mixture for preparing soft silicone elastomers having low exudation properties comprises:
(a) 100 parts by weight of a vinyl-containing base polymer of the formula

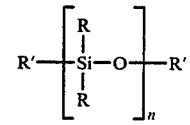

in which
R and R' are alkyl having 1 to 8 carbon atoms, aryl having 3 to 8 carbon atoms, vinyl having 3 to 8 carbon atoms, and fluoroalkyl having 3 to 8 carbon atoms, with the proviso that said base polymer contains a statistical average of 0.5 to 1.8 vinyl groups per molecule, and
x is a sufficiently large number that the viscosity of the polymer is between 0.1 and 300,000 Pascal-seconds at 20° C.,
(b) 0.1 to 50 parts by weight of an organohydrogensiloxane of the formula

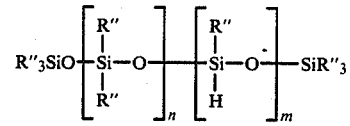

wherein
R" is an alkyl having 1 to 8 carbon atoms, aryl having 3 to 8 carbon atoms or fluoroalkyl having 3 to 8 carbon atoms,
m is at least 3, and the sum of n and m is a sufficiently large number that said siloxane has a viscosity of 0.005 to 0.1 Pascal-seconds at 25° C.,
(c) 1 to 250 ppm of a platinum catalyst, and
(d) 0 to 200 parts by weight of filler.

2 Claims, No Drawings

SOFT SILICONE ELASTOMERS

The present invention relates to platinum-catalysed organopolysiloxane materials, curable at room temperature or using heat, which contain low-vinyl polymers having less than 2 vinyl groups per molecule.

BACKGROUND OF THE INVENTION

Soft silicone elastomers are employed in technology, particularly as sealants. So-called plasticizers are used in these moisture-crosslinking silicone rubbers in order to reduce the crosslinking density and thus the hardness of the product. In principle, all unreactive substances are suitable for this if they are compatible with the silicone matrix. For example, α,ω-bis-(trimethylsiloxy)dimethyl-polysiloxanes are usually used as plasticizers in the 1-component sealants. Although chemically very similar polymers, which differ only by their terminal groups, are mixed during this, the nonfunctional silicone oils exude from the cured rubber when pressure is applied. This technical disadvantage is accepted normally as a necessary disadvantage in the sealant sector.

As is known from DE-A No. 1,769,537, the moduli at 100% elongation of the particular filler-containing, moisture-crosslinking silicone rubbers can be reduced by the use of mixed functional siloxanes (for example 14% of trimethylsiloxy and 86% of dimethoxy(methyl)-siloxy terminal groups) in place of bifunctional siloxanes (100% of dimethoxy(methyl)siloxy terminal groups). The hardness of the product is not affected.

It was not known what influence such partly-functional oils have in filler-containing platinum-catalysed addition systems. Those skilled in the art would expect that it would be possible to transfer the disadvantageous effects described in DE-A No. 1,769,537 to the selectively crosslinked addition systems.

BRIEF DESCRIPTION OF THE INVENTION

Surprisingly, it was found in addition-crosslinked silicone rubber that, besides an expected reduction of the moduli, the hardness of the products also dropped markedly when employing vinyl group-containing oils having less than 2 vinyl terminal groups per molecule.

In addition, completely unexpectedly, the exudation behaviour under the selected test conditions as described below was completely suppressed. This statement is also valid when identical proportions of polymer components which cannot be bonded to the network are present.

Oils which are monofunctional on average also contain 25% of non-functional components due to the random distribution of the terminal groups caused in conventional polymerization. These can be extracted fully from the elastomer composite using n-hexane.

A comparison of two elastomer samples having identical amounts of extractable components shows that the compatibility of the non-reactive siloxanes with the network is obviously improved by the monofunctional polymer components which are bonded to the network, and exudation when pressure is applied does therefore not take place.

DETAILED DESCRIPTION

The present invention thus relates to platinum-catalysed materials, curable at an ambient temperature or using heat, based on polysiloxane, which crosslinked by the addition process, containing (a) 100 parts by weight of a vinyl-containing base polymer of the formula:

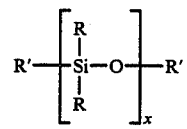

where
R and R' are selected from the group consisting of alkyl radicals having 1 to 8 carbon atoms, aryl radicals having 6 to 9 carbon atoms, vinyl radicals and fluoroalkyl radicals having 3 to 8 carbon atoms, so that the polymer contains a statistical average of 0.5 to 1.8 vinyl groups per molecule, and
x is varied so that the viscosity of the polymers is between 0.1 and 300,000 Pascal-seconds at 20° C., 0.1 to 50 parts by weight of an organohydrogensiloxane of the formula:

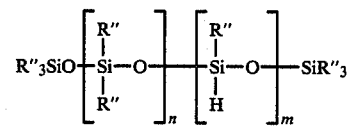

wherein
R" is an alkyl radical having 1 to 8 carbon atoms or aryl and fluoroalkyl radicals having 3 to 8 carbon atoms,
$m \geq 3$ and
$n+m$ is varied so that the polymer has a viscosity of 0.005 to 0.1 Pa.s at 25° C.,
(c) 1 to 250 ppm of a platinum catalyst, and also, if appropriate, inhibitors, and
(d) 0 to 200 parts by weight of an optionally modified filler.

The prepared mixtures may be processed, depending on the recipe, as two component moulding materials, as pumpable liquid silicone rubbers in injection moulding machines or solid rubbers for processing on roll mills. The soft elastomer parts produced by these routes can replace silicone foams, inter alia. Low-Shore sealing elements with such mixtures exhibit no disadvantageous exudation of oil when pressure is applied.

If high strength values are not necessary, extremely soft elastomers can be prepared having Shore hardnesses below 1.

The starting components (a) and (b) are conventional, generally known materials, such as those, for example, also described in DE-A No. 3,139,316. The mixed termination is achieved by addition of a mixture of the pure bifunctional terminators.

Pt catalysts, particularly Pt(O) complexes having vinylsiloxanes as ligands, are conventionally used for addition-crosslinking systems.

If appropriate, it may be necessary to delay the crosslinking reaction at room temperature by adding inhibitors. Acetylenic compounds, such as alcohols such as, for example, 2-methylbut-3-in-2-ol, ethinyl cyclohexanol, tetramethyltetravinylcyclotetrasiloxane or tetramethyldivinyldisiloxane, are suitable for this purpose.

Conventional materials, for example pyrogenic and precipitated, finely-divided silicas having a BET surface area of 50–400 m²/g, may be employed as fillers.

Such fillers may be surface-modified, for example using organosilicon compounds. The modification may also be achieved during the incorporation by adding hexamethyldisilazane or tetramethyldivinylsilazane, for example, with addition of water.

Substances such as, for example, diatomaceous earths, finely-divided quartz sands, chalks, amorphous silicas or carbon blacks may further be employed as fillers.

The materials according to the invention are prepared in a general embodiment approximately as follows:

The filler, if appropriate with addition of disilazanes and water and heat, is distributed uniformly in the vinyl-containing base polymer, and then mixed with the SiH-containing polysiloxane, the platinum catalyst and an inhibitor. This mixture is vulcanized by storing at room temperature or by application of heat.

The present invention is described in still greater detail with reference to the following examples (parts denote—unless otherwise stated—parts by weight).

EXAMPLE 1

100 parts of dimethylvinylsiloxy-terminated polydimethylsiloxane (A) having a viscosity of 40 Pa.s are mixed in a kneader with 7 parts of hexamethyldisilazane and 4 parts of water, and subsequently kneaded with 37 parts of silica, prepared pyrogenically, having a specific surface area of 300 m$^2$/g according to BET to form a homogeneous material. The mixture is initially warmed to 130° C. and stirred in a sealed kneader for 1.5 hours and then freed of water and excess charging agent residues in vacuo at 160° C. After cooling the mixture, the latter is blended with 490 parts of polymer A, 112 parts of trimethylsiloxy-terminated polydimethylsiloxane (B) having a viscosity of 40 Pa.s, 6 parts of trimethylsiloxy-terminated polydimethylsiloxane (D) containing 4 mmol of SiH/g and having a viscosity of 0.02 Pa.s, 0.02 parts of a complex compound of platinum and tetramethyltetravinylcyclotetrasiloxane (Pt content: 15% by weight) and 0.2 part of 2-methylbut-3-in-2-ol, and cured for 10 minutes at 175° C.

EXAMPLE 2

Example 1 is repeated using a 60 mol-% dimethylvinylsiloxy-terminated and 40 mol-% trimethylsiloxy-terminated polymer (C) in place of polymers (A) and (B). The polymer has a random distribution of the terminal groups, i.e. 16% of the molecules are non-functional. Accordingly, the polymer mixture in Example 1 contains 16% of the non-functional polymer B.

EXAMPLE 3

Example 2 is repeated using a 50 mol-% dimethylvinylsiloxy-terminated and 50 mol-% trimethylsiloxy-terminated polymer (D) in place of polymer C.

EXAMPLE 4

A mixture of the following components is prepared in a kneader, as described in Example 1, and subsequently cured in 10 minutes at 175° C.:
100 parts of polymer A,
8 parts of hexamethyldisilazane
4 parts of water
40 parts of pyrogenic silica (300 m$^2$/g)
23 parts of polymer B
17 parts of polymer A
2 parts of crosslinking agent D
10 ppm of Pt as Pt complex
400 ppm of 2-methylbutin-3-ol-2

EXAMPLE 5

Example 4 is repeated using polymer C in place of the mixture of polymer A and B.

EXAMPLE 6

A mixture of the following components is prepared in a kneader as described in Example 1, and subsequently cured in 10 minutes at 175° C.:
100 parts of polymer A
7 parts of hexamethyldisilazane
4 parts of water
37 parts of pyrogenic silica (300 m$^2$/g)
250 parts of polymer B
2.2 parts of crosslinking agent D
6 ppm of Pt as Pt complex
240 ppm of 2-methylbutin-3-ol-2
Physical properties of the vulcanisates

|  | Example 1 | Example 2 | Example 6* |
| --- | --- | --- | --- |
| Hardness (Shore A) | 12 | <1 | <1 |
| Modulus at 100% (MPa) | 0.2 | 0.04 | 0.05 |

*The mechanical properties of Example 2 can be achieved using a very high dosage of the non-functional polymer (B). However, the vulcanisate exhibits an unacceptably high exudation behaviour.

Extractable components and exudation behaviour

The extractable components were determined by storing 5 g of elastomer plates (thickness: 2 mm), cut into small pieces, for 4 hours in 100 ml of boiling n-hexane. The residue from the hexane solution, separated off and evaporated at 100° C. was related to the weight of elastomer employed.

A cylindrical sample element having the following dimensions was used for the determination of the exudation behavior:
height: 6 mm,
diameter: 12 mm.

The sample element was pressed, deformed by 25%, against an absorptive paper for 24 hours during the test. The exudation behaviour was assessed using the size of the grease spot formed.

|  | Assessment |
| --- | --- |
| No grease spot | 0 |
| Grease spot diameter |  |
| <12 mm | — |
| >12 mm | — |

| Example | Extractable proportion (% by weight) | Exudation process |
| --- | --- | --- |
| No. 1 | 14 | — |
| No. 2 | 13 | 0 (no exudation) |
| No. 3 | 18 | 0 (no exudation) |
| No. 4 | 12 |  |
| No. 5 | 12 | 0 (no exudation) |
| No. 6 | 63 | —* |

*Oil also exuded from the elastomer without the application of pressure.

What is claimed is:

1. A mixture for preparing soft silicone elastomers having low exudation properties which comprises:
  (a) 100 parts by weight of a vinyl-containing base polymer of the formula:

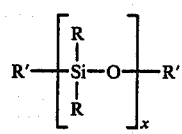

where
R and R' are selected from the group consisting of alkyl radicals having 1 to 8 carbon atoms, aryl radicals having 6 to 9 carbon atoms, vinyl radicals and fluoroalkyl radicals having 3 to 8 carbon atoms, with the proviso that said base polymer contains a statistical average of 0.5 to 1.8 vinyl groups per molecule, and x is a sufficiently large number that the viscosity of the polymer is between 0.1 and 300,000 Pascal-seconds at 20° C., (b) 0.1 to 50 parts by weight of an organohydrogensiloxane of the formula:

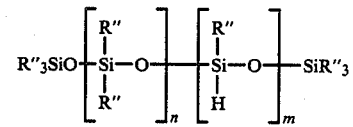

wherein
R" is an alkyl having 1 to 8 carbon atoms, aryl having 6 to 9 carbon atoms or fluoroalkyl having 3 to 8 carbon atoms, m is at least 3, and the sum of n and m is a sufficiently large number that said siloxane has a viscosity of 0.005 to 0.1 Pascal-seconds at 25° C.

(c) 1 to 250 ppm of a platinum catalyst, and
(d) 0 to 200 parts by weight of filler.

2. A mixture according to claim 1 which is cured.

* * * * *